US005659603A

United States Patent [19]
Orlofsky

[11] Patent Number: 5,659,603
[45] Date of Patent: Aug. 19, 1997

[54] METHOD FOR PRINTING KEY TELEPHONE DESIGNATION STRIPS

[75] Inventor: Thomas Paul Orlofsky, Lincroft, N.J.

[73] Assignee: Lucent Technologies Inc., Murray Hill, N.J.

[21] Appl. No.: 315,515

[22] Filed: Sep. 30, 1994

[51] Int. Cl.⁶ .............................. H04M 1/00; G06K 1/00
[52] U.S. Cl. ........................ 379/157; 379/156; 395/117
[58] Field of Search ................................. 379/156, 157, 379/165, 166, 201, 164, 396, 354, 267; 395/155, 161, 921, 922, 117

[56] References Cited

U.S. PATENT DOCUMENTS

| | | | |
|---|---|---|---|
| 4,141,045 | 2/1979 | Sheehan | 360/15 |
| 4,254,416 | 3/1981 | Lelke | 178/30 |
| 4,534,012 | 8/1985 | Yokozawa | 364/900 |
| 4,631,364 | 12/1986 | Coyne | 379/165 |
| 4,734,710 | 3/1988 | Sato et al. | 235/385 |
| 4,734,713 | 3/1988 | Sato | 235/385 |
| 4,800,582 | 1/1989 | D'Agosto | 379/356 |
| 5,299,256 | 3/1994 | Hu | 379/157 |
| 5,309,509 | 5/1994 | Cocklin | 379/165 |
| 5,392,337 | 2/1995 | Baals | 379/396 |
| 5,396,548 | 3/1995 | Bayerl | 379/157 |
| 5,455,898 | 10/1995 | Mahoney | 395/133 |
| 5,495,567 | 2/1996 | Iizawa | 395/921 |

Primary Examiner—Curtis Kuntz
Assistant Examiner—Vijay Shankar
Attorney, Agent, or Firm—Frederick B. Luludis

[57] ABSTRACT

A facility is provided to enable a user of a telecommunications system, for example, a key telephone system, to automatically print labels for the designation strips of a telephone station set connected to the telecommunications system. In particular, when a user changes the functions (features) associated with respective ones of the station set buttons, then the user may print the labels for the designation strips associated with those buttons, in which the printing is done automatically on paper stock having designation strip labels printed thereon, in which the layout of the printed labels is customized for the particular station set.

6 Claims, 9 Drawing Sheets

AT&T 7507 STATION TEMPLATE

REMARKS=BUTTON LOCATIONS FOR AT&T DIE CUT INSERT
PART NO. 50 OR PART NO. 846120376.
BUTTON=1,0.7,0.8
BUTTON=2,0.7,1.3
BUTTON=3,0.7,1.8
BUTTON=4,0.7,2.3
BUTTON=5,0.7,2.8
BUTTON=6,2.2,0.8
BUTTON=7,2.2,1.3
BUTTON=8,2.2,1.8
BUTTON=9,2.2,2.3
BUTTON=10,2.2,2.8
BUTTON=11,3.7,0.8
BUTTON=12,3.7,1.3
BUTTON=13,3.7,1.8
BUTTON=14,3.7,2.3
BUTTON=15,3.7,2.8
BUTTON=16,3.7,3.3
BUTTON=17,3.7,3.8
BUTTON=18,3.7,4.3
BUTTON=19,3.7,4.8
BUTTON=20,5.2,0.8
BUTTON=21,5.2,1.3
BUTTON=22,5.2,1.8
BUTTON=23,5.2,2.3
BUTTON=24,5.2,2.8
BUTTON=25,5.2,3.3
BUTTON=26,5.2,3.8
BUTTON=27,5.2,4.3
BUTTON=28,5.2,4.8
BUTTON=29,5.2,5.3
BUTTON=30,5.2,5.8
BUTTON=31,0.7,3.7
BUTTON=32,0.7,3.8
BUTTON=33,0.7,4.3
BUTTON=34,0.7,4.8
BUTTON=35,0.7,5.3
BUTTON=36,0.7,5.8
BUTTON=37,2.2,3.8
BUTTON=38,2.2,4.3
BUTTON=39,2.2,4.8
BUTTON=40,2.2,5.3

*FIG. 4*

FIG.5
AT&T 7507 STATION TEMPLATE

| | | | |
|---|---|---|---|
| 1: 0.7×0.8 | 6: 2.2×0.8 | 11: 3.7×0.8 | 20: 5.2×0.8 |
| 2: 0.7×1.3 | 7: 2.2×1.3 | 12: 3.7×1.3 | 21: 5.2×1.3 |
| 3: 0.7×1.8 | 8: 2.2×1.8 | 13: 3.7×1.8 | 22: 5.2×1.8 |
| 4: 0.7×2.3 | 9: 2.2×2.3 | 14: 3.7×2.3 | 23: 5.2×2.3 |
| 5: 0.7×2.8 | 10: 2.2×2.8 | 15: 3.7×2.8 | 24: 5.2×2.8 |
| | | 16: 3.7×3.3 | 25: 5.2×3.3 |
| | | 17: 3.7×3.8 | 26: 5.2×3.8 |
| 32: 0.7×3.8 | 37: 2.2×3.8 | 18: 3.7×4.3 | 27: 5.2×4.3 |
| 33: 0.7×4.3 | 38: 2.2×4.3 | 19: 3.7×4.8 | 28: 5.2×4.8 |
| 34: 0.7×4.8 | 39: 2.2×4.8 | | 29: 5.2×5.3 |
| 35: 0.7×5.3 | 40: 2.2×5.3 | 31: 3.7×5.8 | 30: 5.2×5.8 |
| 36: 0.7×5.8 | | | |

AT&T 7507 STATION TEMPLATE

METHOD FOR PRINTING KEY TELEPHONE DESIGNATION STRIPS

FIELD OF THE INVENTION

The invention relates to enabling a telephone customer to print telephone line, feature and directory number designation strips to track corresponding changes made in an associated telecommunications system.

BACKGROUND OF THE INVENTION

It is not unusual for a business telephone customer to be associated with multiple telephone lines connected to one or more telephone station sets. In this way, the business customer may access any one of the telephone lines from any one of the telephone sets to originate or answer a call. In certain instances, the customer may find it desirable to associate various ones of the telephone lines with selected ones of the telephone sets. The business customer may also find it desirable to have various telephone services/features assigned to selected ones of the telephone lines, in which such services/features are provided by an associated telecommunications system, e.g., an electronic key telephone system that interfaces the customer's telephone lines with a local exchange carrier. Such services/features include, for example, call forwarding, call waiting, call transfer, distinctive ringing, etc. Moreover, the telephone stations sets may be equipped with key buttons that may be used to invoke such features as privacy, speed calling, call hold, etc., in which such latter features are typically provided by a particular type of telephone system, e.g., an electronic key telephone system, that interfaces the telephone stations sets with the aforementioned telephone lines. Each such telephone station set may include a number, e.g., one, six, ten, thirty, etc., of station set buttons (key buttons), in which the buttons may be associated with respective telephone lines (i.e., telephone numbers) or services/features.

A customer may, from time to time, want to add or remove telephone lines associated with various telephone sets. In addition, a customer may want to change directory numbers associated with various ones of the telephone sets and to add, delete or rearrange various features associated with respective buttons of a telephone station set. So-called electronic key telephone management systems are currently available which enable customers to control and implement changes to customer electronic key telephone systems served by a telephone switching system. That is, the business customer may interact with the management system to assign (or cancel) a particular telephone feature to a telephone station set button selected by the customer. What this means is that the feature (function) that is associated with a particular telephone station button is selected by the customer and not by the manufacturer of the station set. In addition, the customer typically affixes a paper label identifying the feature at or near the button (or associated lamp), as is well-known.

A sheet of such button identification (or designation) labels is usually printed for an electronic key telephone station set once the features/functions associated with the buttons (keys) and lamps have been programmed into the station set or associated electronic key system. In most instances the printing of labels involves the use of manufactured die-cut paper having a layout of labels customized for a particular station set. The business customer writes or prints the button designations at the appropriate label locations on the die-cut paper stock and then tears the paper along die cut perforations to break out each label so that it may be affixed to a telephone station set.

I have recognized that the size of the paper stock and locations of the perforations defining the layout of labels varies between the manufacturers of telephone station sets and also varies between different models of telephone station sets of the same manufacturer. Also, the business customer employs various printing devices with different methods to feed and align the paper stock relative to the printed information. As such, it is expensive to store different paper stock for different telephone station sets and it is also expensive to manually "fill in" labels printed on paper stock to identify the functions of the buttons and lamps of a respective telephone station set.

SUMMARY OF THE INVENTION

The foregoing problem is solved by employing a graphical user interface workstation to (1) store customer defined telephone button and line features that are associated with respective buttons of a particular station set in memory, in which the association is based on assigning a unique identifier to each of the station set buttons; (2) creating a template file defining a layout of labels (designation strips) matching a predetermined layout of labels on a sheet of paper stock, in which the template labels correspond with respective ones of the identifiers; and (3) then combining the stored customer-defined telephone button and line features with the template and outputting the result to a printer such that text and/or telephone line numbers representing the features associated with identifiers are printed at label locations on the paper stock defined by the template.

DETAILED DESCRIPTION

Figure 1:
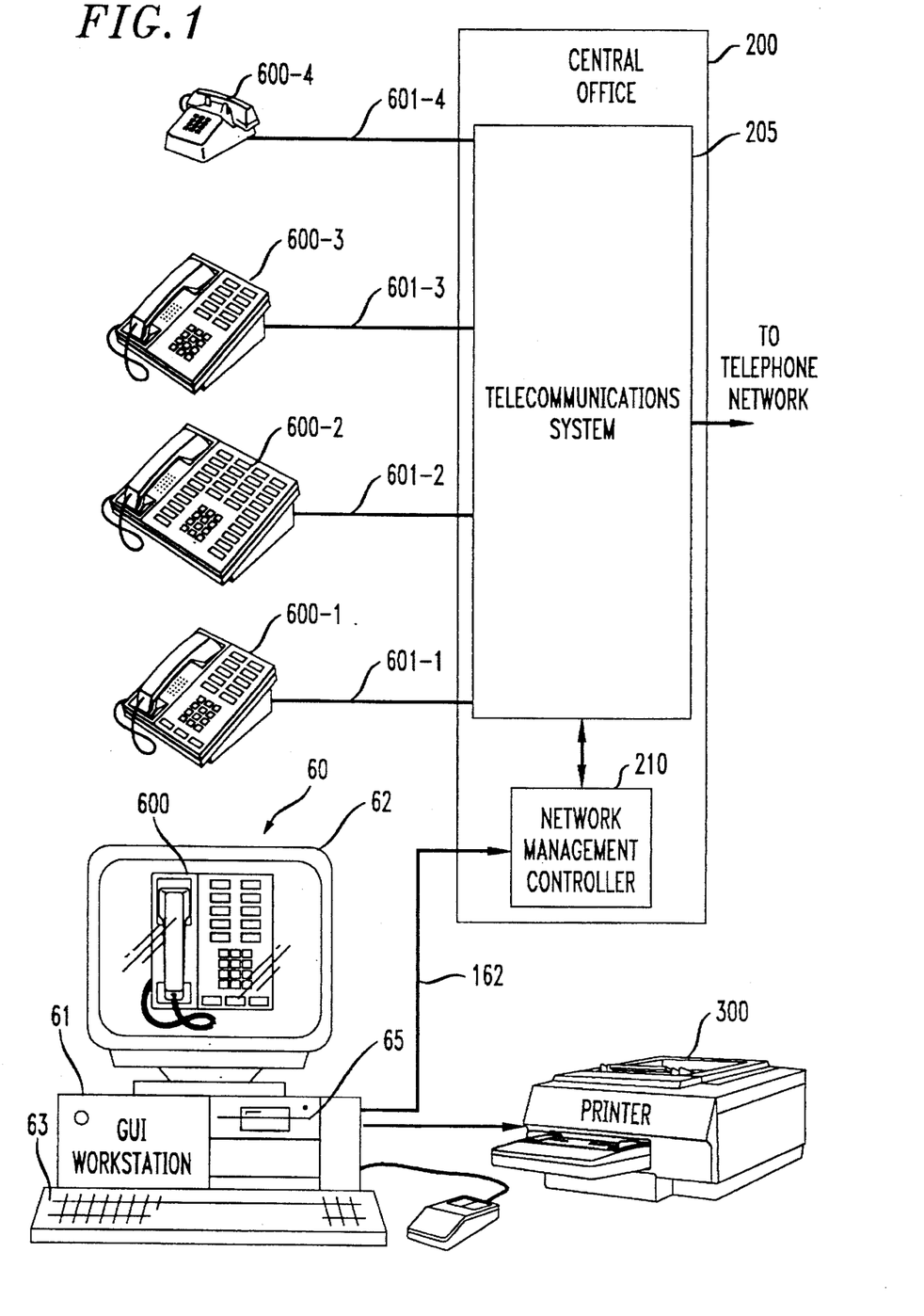
FIG. 1 illustrates a broad block diagram of a telecommunications system in which the principles of the invention may be practiced.

In an exemplary embodiment of the invention, electronic key telephone management controller 210, FIG. 1, enables a customer served by telecommunications system 205 to control and implement additions and changes to the various key telephone system features and/or services provided by telecommunications system 205. In an illustrative embodiment of the invention, telecommunications system 205 may be any of a number of well-known types of telephone switching systems, such as an AT&T 5ESS™ electronic switching system associated with a Central Office (CO), e.g., CO 200, wherein switch code instructions stored system 205 provides a customer service called Centrex and wherein a business customer may subscribe to private branch exchange and electronic key telephone services. In the electronic key telephone service, the customer associated with key telephone station sets 600-1 through 600-4 may connect those station sets via telephone lines 601-1 through 601-4, respectively, to system 205 for the purpose of obtaining electronic key telephone services.

A typical electronic key telephone system may have various combinations of telephone sets, such as a 13-key button telephone set 600-1, a 30-key button telephone set 600-2, and a 10-key button telephone set 600-3. An electronic key telephone system may also have a regular telephone set 600-4 which does not have buttons but which can be provided with certain key telephone system features.

Each customer telephone set may be connected via a respective telephone line to system 205, as mentioned above. For example, 13-key button telephone set 600-1 may be connected to CO 200 by 4 telephone lines, as represented by telephone line 601-1. The 30-key button telephone set 601-2, on the other hand, may be connected to CO 200 by 5 telephone lines, as represented by telephone line 601-2, and so on as such pertains to station sets 600-3 and 600-4.

Telecommunications system 205 is arranged so that various telephone lines and directory numbers may be assigned to a telephone set, e.g., station 600-1, and its associated line connecting to system 205. Some examples of the telephone line features may be a conventional flat rate and message rate class of service, wherein a customer may elect to lease a telephone line by paying a flat monthly fee or a fee for each call made on the telephone line, respectively.

More particularly and in accord with an illustrative embodiment of the invention, conventional Graphical User Interface (GUI) workstation 60, FIG. 1, enables the associated business customer to interact via path 162 with network management controller 210 associated with system 205 for the purpose of, for example, adding or changing various features/services respectively associated with multibutton telephone station sets 600-1 through 600-4 and/or their associated telephone lines 601-1 through 601-4, respectively.

Such features include, for example and in addition to the above-mentioned features, a call transfer (CT) function wherein telephone calls may be transferred to other telephone lines and/or an authorization code telephone line wherein telephone calls may be placed to special telephone numbers by dialing a special code over a telephone line associated with such a feature. The customer may also elect to have a particular telephone line placed on Call Forward Busy or Don't Answer when it is inconvenient to answer telephone calls on the telephone line. In addition, a customer may wish to have a distinctive ring (DR) feature assigned to various telephone lines, such as having an incoming local telephone call, identified by a single ring and an incoming toll telephone call identified by multiple rings.

A business customer may also interact with workstation 60 for the purpose of assigning special key features to a key button of a particular customer telephone set. For example, a redial feature may be assigned to a key button of a telephone set so that a customer having dialed a busy telephone number may operate the key button of the telephone set to automatically redial the telephone number associated the last called station set, i.e., the busy telephone number. A customer may elect to have Intercom Calling or speed calling key button features wherein the customer may operate the intercom key button to connect to a special telephone line or the SC key button so that by dialing a predetermined abbreviated telephone number the customer can be connected with the telephone set identified by the telephone number. Call hold button features are available so that a customer may operate a key button of a telephone set to place an incoming telephone call or a telephone line coupled with the telephone set on hold. Conferencing Calling is available as a key button feature so that a telephone customer may operate a key button so as to conference several telephone lines.

It is to be understood that the foregoing illustrates only a few of the many other telephone features/services that system 205 may offer the associated business customer.

The business customer may thus interact with network management controller 210 connected to system 205 via GUI workstation 60 for the purpose of changing (or assigning) the features/services that may be invoked at one or more of the telephone station sets 600-1 through 600-4. In an illustrative embodiment of the invention, network management controller 210 may operate in accord with the teaching disclosed in U.S. Pat. No. 4,905,274 issued Feb. 27, 1990 to B. A. Cooper, which is hereby incorporated by reference, and GUI workstation 60 may operate in accord with the teaching of U.S. Pat. No. 5,309,509 issued May 3, 1994 to S. L. Cocklin et al, which is also hereby incorporated herein by reference.

Specifically, workstation 60 connected to controller 210 enables a user (customer) to readily implement service/feature changes to telephone station sets connected to system 205, in which controller 210 is arranged to interact with system 205 to effect such changes, as disclosed in the aforementioned Cocklin patent. As a result of the interaction between workstation 60 and controller 210, workstation 60 may obtain from controller 210 a data file embodying a high resolution graphical representation of a telephone set, e.g., station 600-2, for storage in local memory, e.g., disk 65. The user may then interact with workstation processor 61 via keyboard 63 to display the file on display 62, as shown in FIG. 1. (A more detailed example of such a display is shown in FIG. 3 of the aforementioned Cocklin patent. As shown in that FIG., the station set buttons are associated with respective logical identifiers, e.g., the numbers 1, 2, 3, 4 and so on. The Cocklin patent FIG. also shows the functions (features, services, etc.) associated with a button identifier. That is, the FIG. shows a list of button identifier in one column and shows their associated function in an adjacent column. The association between a button identifier and its associated function is used in the instant invention in the manner discussed below.)

Once a facsimile of the desired station set, e.g., station 600-1, is displayed, then the user may selectively add or change telephone lines, features and/or directory numbers that are to be associated with particular ones of the displayed key button locations. Processor 61, responsive thereto, converts the user's entries into instructions and transmits the instructions to network management controller 210 via path 162. Controller 210 then directs customer telephone network 205 to implement such instructions, i.e., to assign the user selected telephone lines, features and directory numbers to a selected one of the telephone station sets, e.g., station set 600-2. In addition, the database file for the associated station set is updated to reflect the user's entries implemented at system 205.

Based on the foregoing, I have recognized that a file associated with a particular station set and stored in network management controller 210 (herein also "database file") may be used advantageously to generate the printed labels for the station set buttons. The database file, more particularly, may be used as an overlay on a data template defining the label identification strips matching corresponding label locations on associated die-cut paper stock specifically designed for the station set. A label template for a particular station set may be readily designed using the associated paper stock as a guide to create a data file defining the layout of the button labels on the paper stock.

Figure 2:
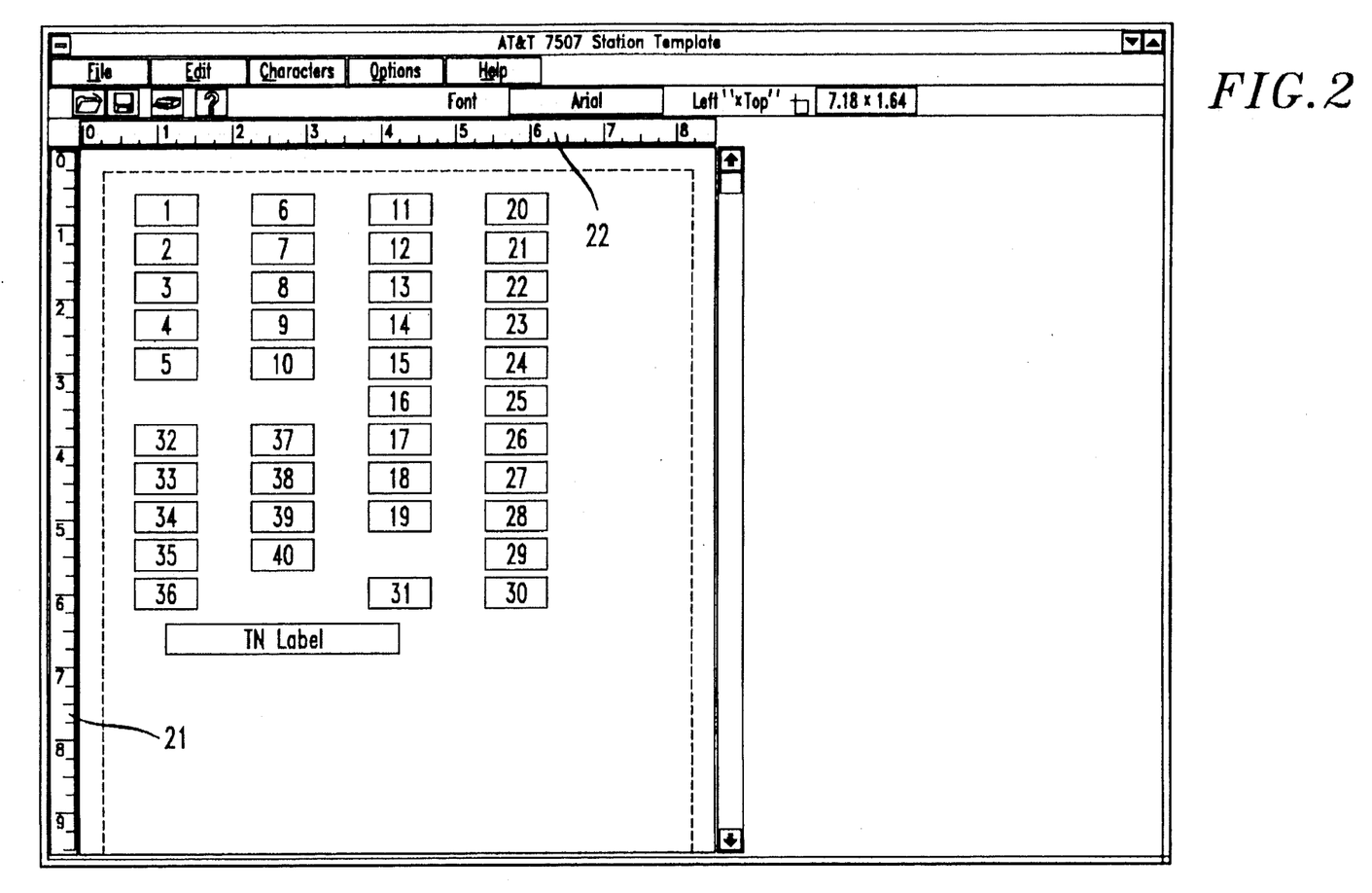
FIG. 2 is an illustrative example of a graphical display of a template defining the layout of designation strips for a particular customer telephone station set which a user creates as a result of the user interacting with the workstation of FIG. 1.
Figure 3:
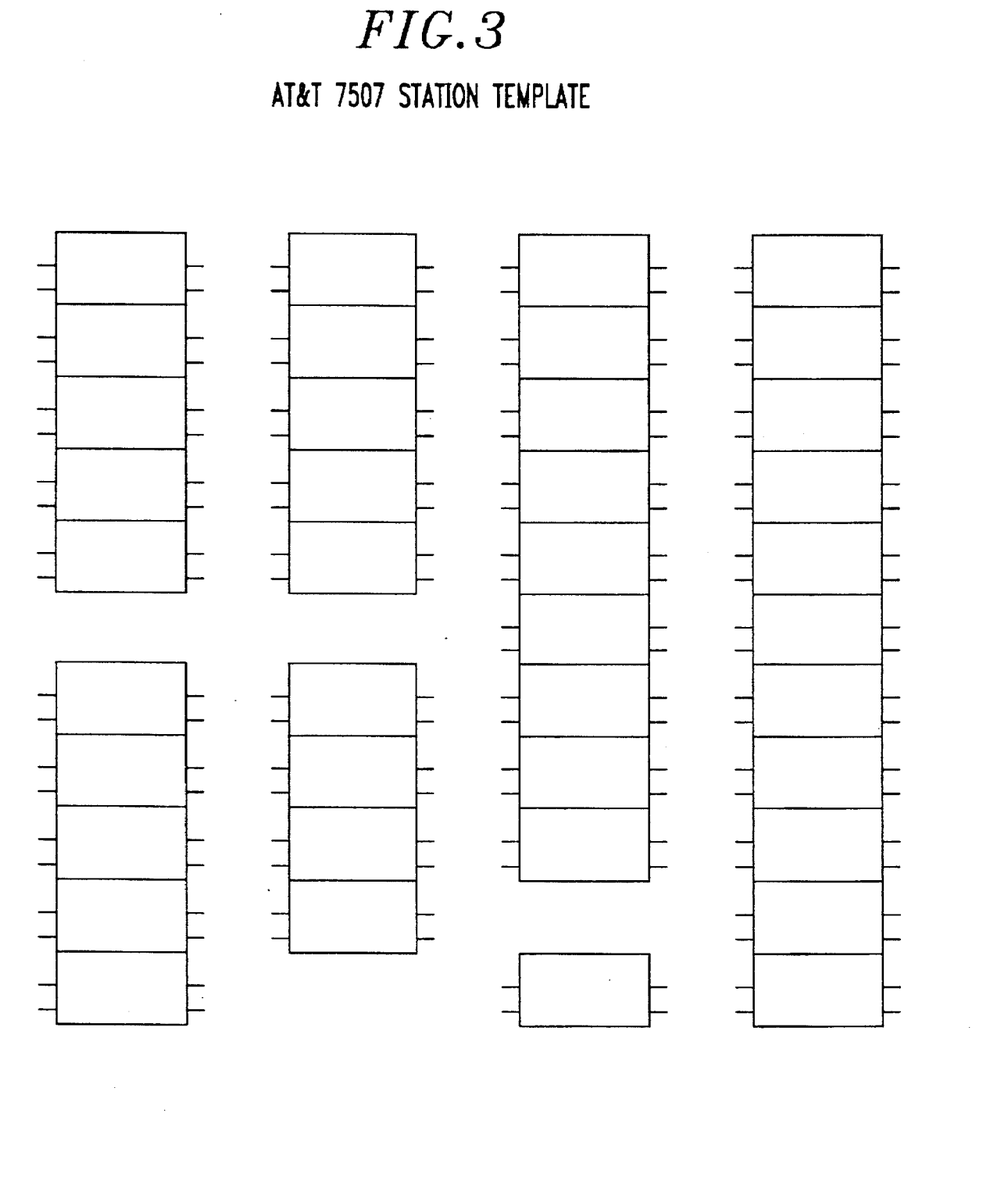
FIG. 3 is an illustrative example of paper stock that is used in the printing of designation strips.
Figure 4:
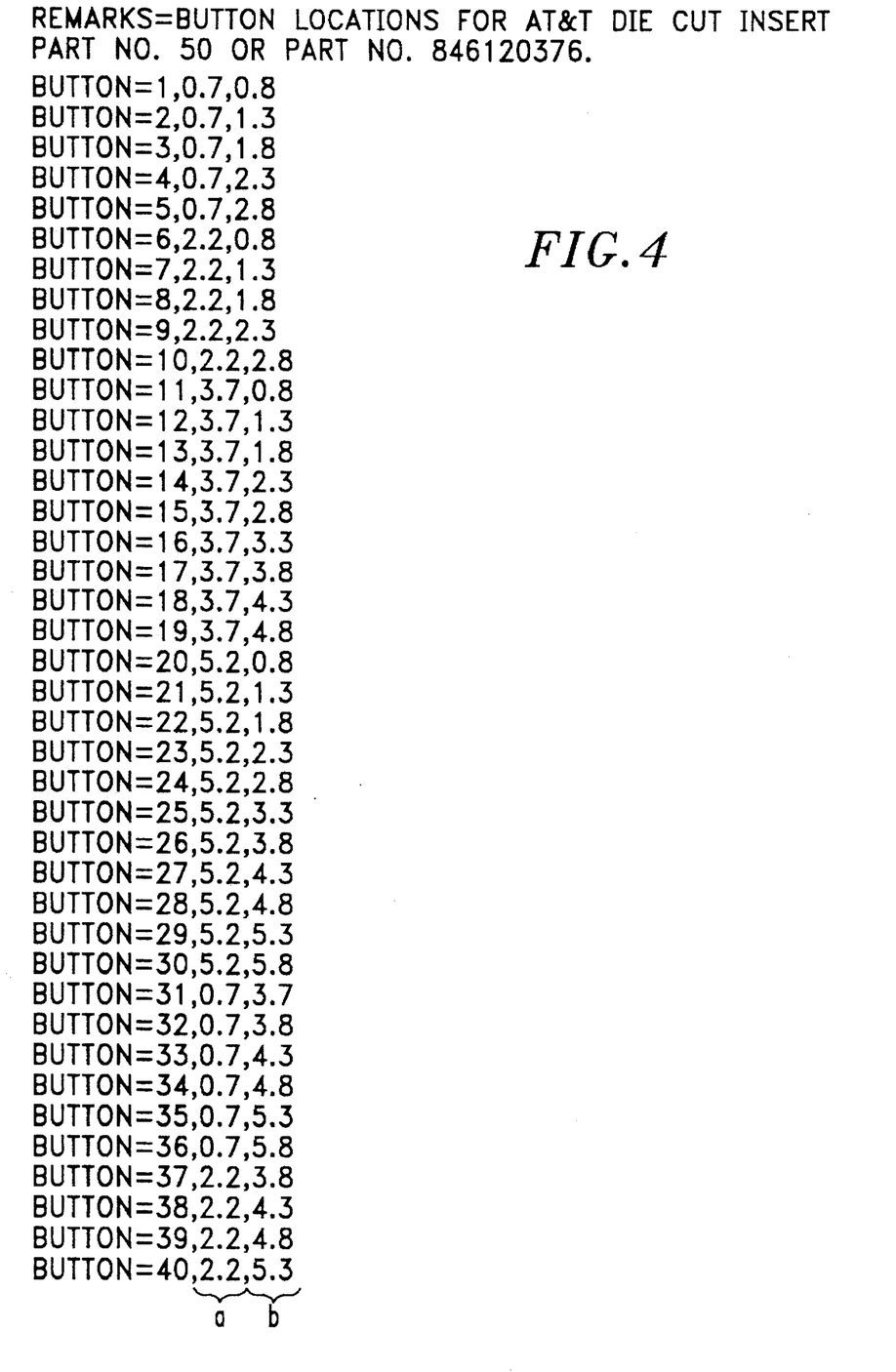
FIG. 4 illustrates the template data file that is derived from and defines the displayed template of FIG. 2.
Figure 5:
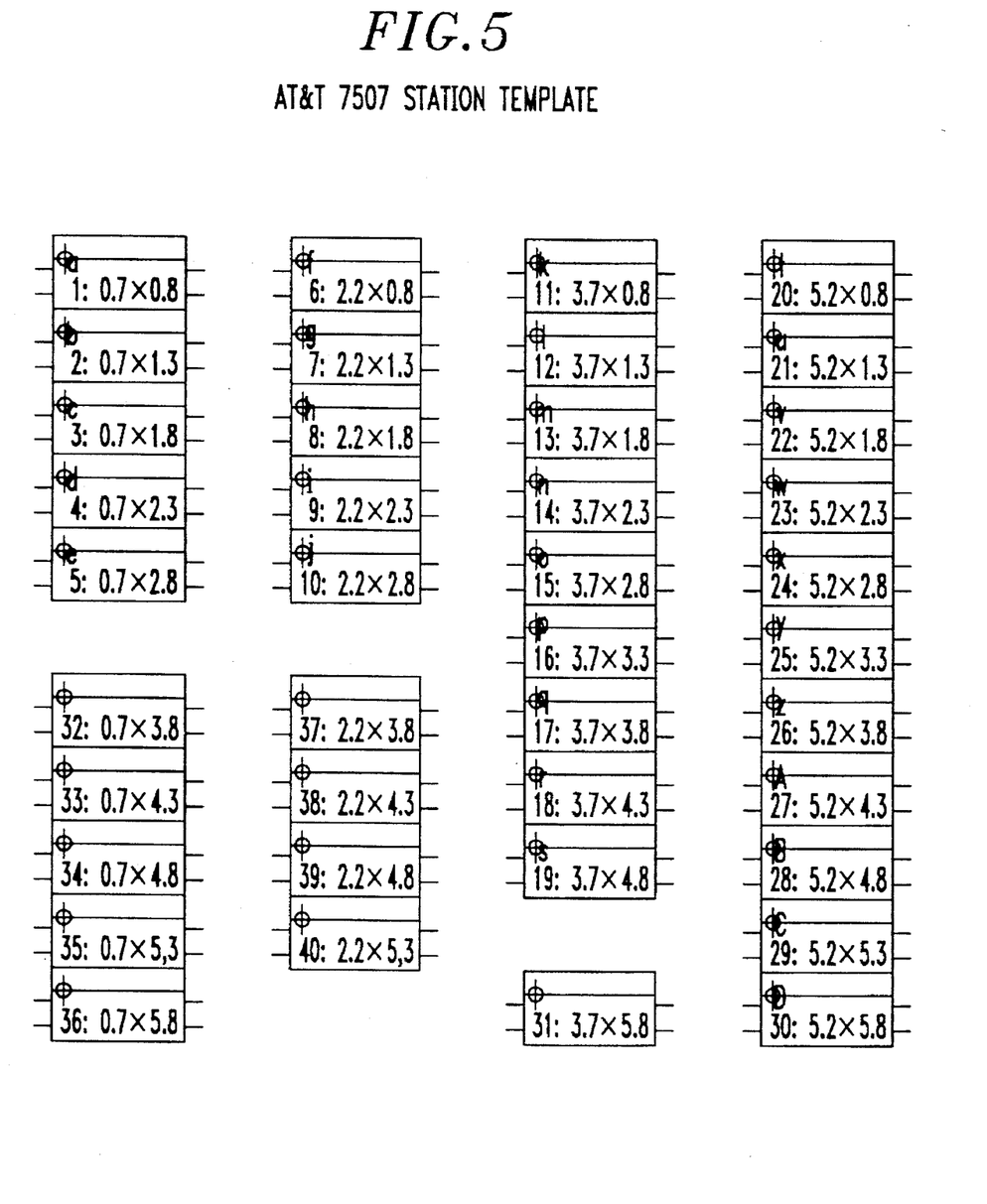
FIG. 5 is an illustrative example of a registration print out of the file of FIG. 3.

A data file defining a template for a particular stock paper may be created using a software application executing on the GUI Workstation 60. Specifically, when using such an application, a user may "draw" on display 62 a layout of the designation strips (labels) that correspond to the layout of the die-cut labels printed on particular die-cut stock paper for a particular station set, for example, the paper stock for station set 600-2. In addition, the user may associate the displayed designation strips with respective station set button identifiers. A resulting display of such a layout including button identifiers is illustrated in FIG. 2, and an illustrative example of the die-cut paper stock designed for station set 600-2 is shown in FIG. 3. The displayed layout (FIG. 2) is preserved as a list of instructions defining the layout locations for 40 button labels as shown in FIG. 4. The list of instructions include measurements a and b which respectively define in inches the upper left-hand corner of the corresponding displayed labels (FIG. 2) relative to displayed rulers 21 and 22. Accordingly, once the user creates a template file in a conventional manner, e.g., the template file of FIGS. 2 and 4, the user may then output the file to printer 300 (FIG. 1) for printing on the corresponding die-cut paper stock. In this way the user may verify whether the locations specified in the template are printed within the desired die-cut area reserved for the corresponding label. More particularly, when printer 300 prints a hard copy of the template file onto the die-cut paper, as shown in FIG. 5, the result shows a printed "bullseye" defining where a corresponding text (or numbers) would be printed on the respective die-cut label. The coordinates specified for an associated "bullseye" are also printed, as shown in the FIG. At that point, the user may inspect FIG. 5 to ensure that each "bullseye" is approximately located at the desired point within the corresponding button label. If it is not, then the user may iteratively interact with workstation 60 to adjust the locations of the displayed button labels (FIG. 2) with respect to the displayed rulers 21 and 22 and print the template file until the desired result is obtained.

Figure 6:
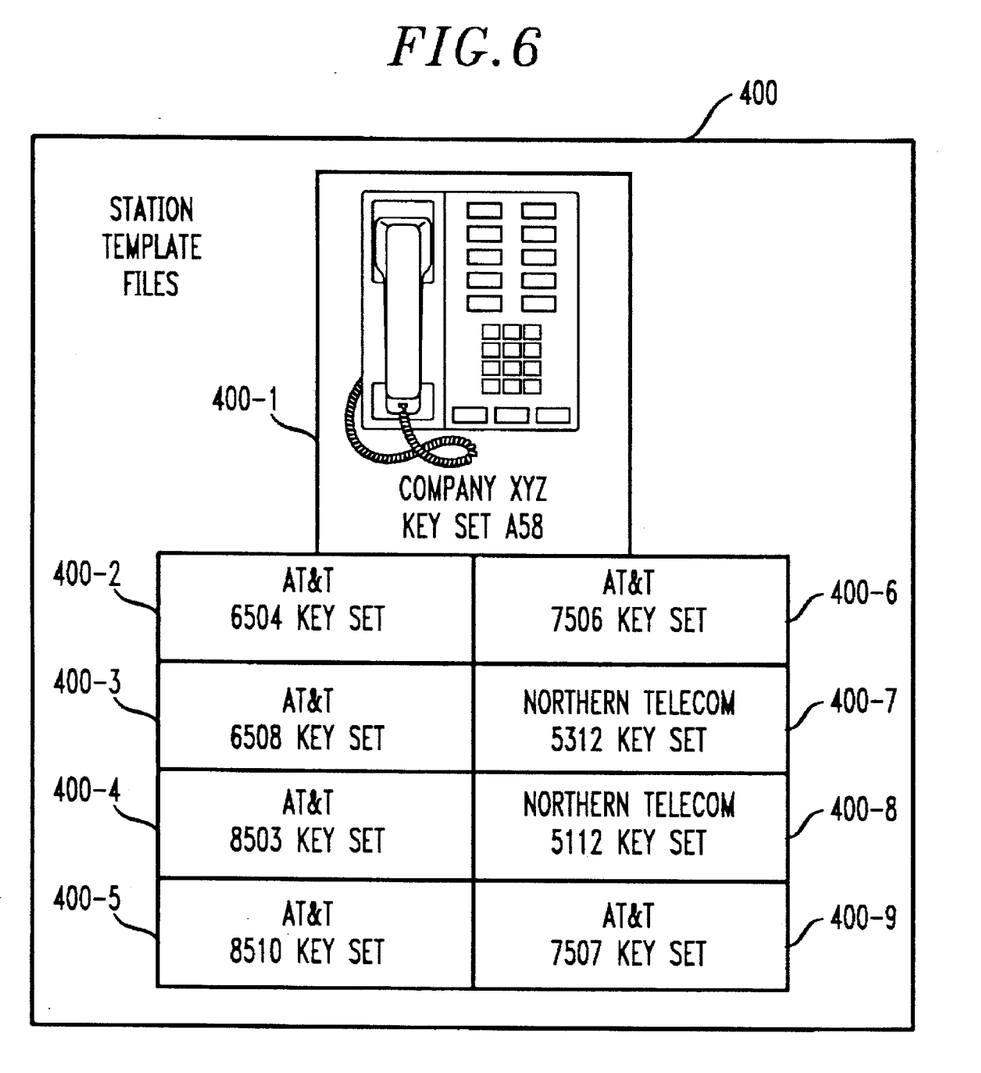
FIG. 6 illustrates a layout of a database of label templates in which the database may be created in the workstation of FIG. 1.
Figure 7:
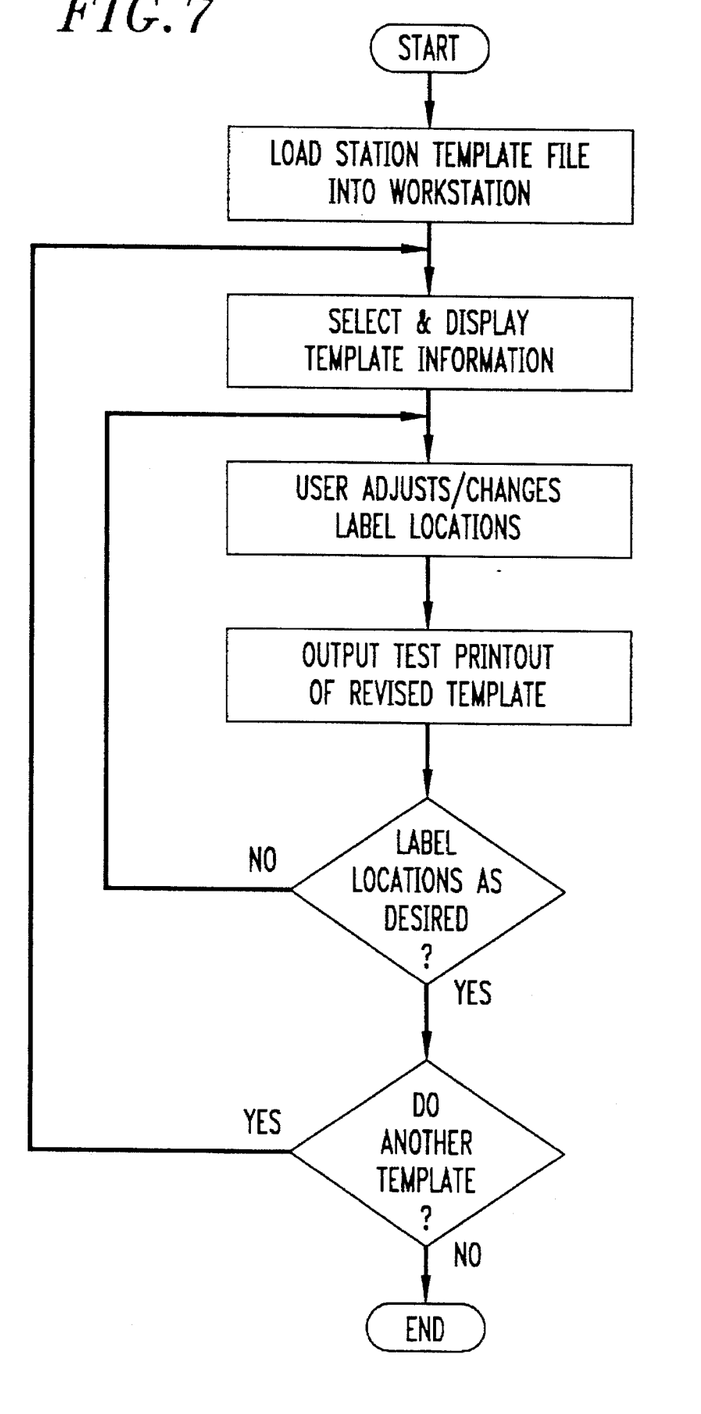
FIGS. 7 and 8 illustrate the process steps that are followed to create a label (designation strip) template in accord with the principles of the invention.

Once the user is satisfied that the printed test corresponds, as desired, with the label layout on the associated die cut stock paper (e.g., FIG. 3), then the user may enter a command directing workstation 60 to store the new template (FIG. 4) file in a database of hard disc 65. An example, of a layout of such a database is illustrated in FIG. 6. Database 400 includes a plurality of template files, for example, template files 400-1 through 400-9 associated with respective types of telephone station sets, e.g., station 600-1 associated with file 400-1. It is assumed that database 400 includes other template files associated with other types (models) of business telephone station sets and that such telephone sets may be manufactured by different manufacturers, for example, AT&T, Northern Telecom, etc. (It is noted that the model identifiers specified are fictitious. It is also noted that the method steps for creating such a template are shown in flow chart form in FIG. 6. However, FIG. 6 will not be discussed herein, since the steps illustrated therein are readily apparent from and repetitious of the foregoing discussion).

Thus, as a result of the foregoing, a template file defining the locations of the labels associated with respective button and lamp locations for a specific model of a business telephone station is stored in association with its respective model number in the database 400 of hard disc unit 65.

Figure 8:
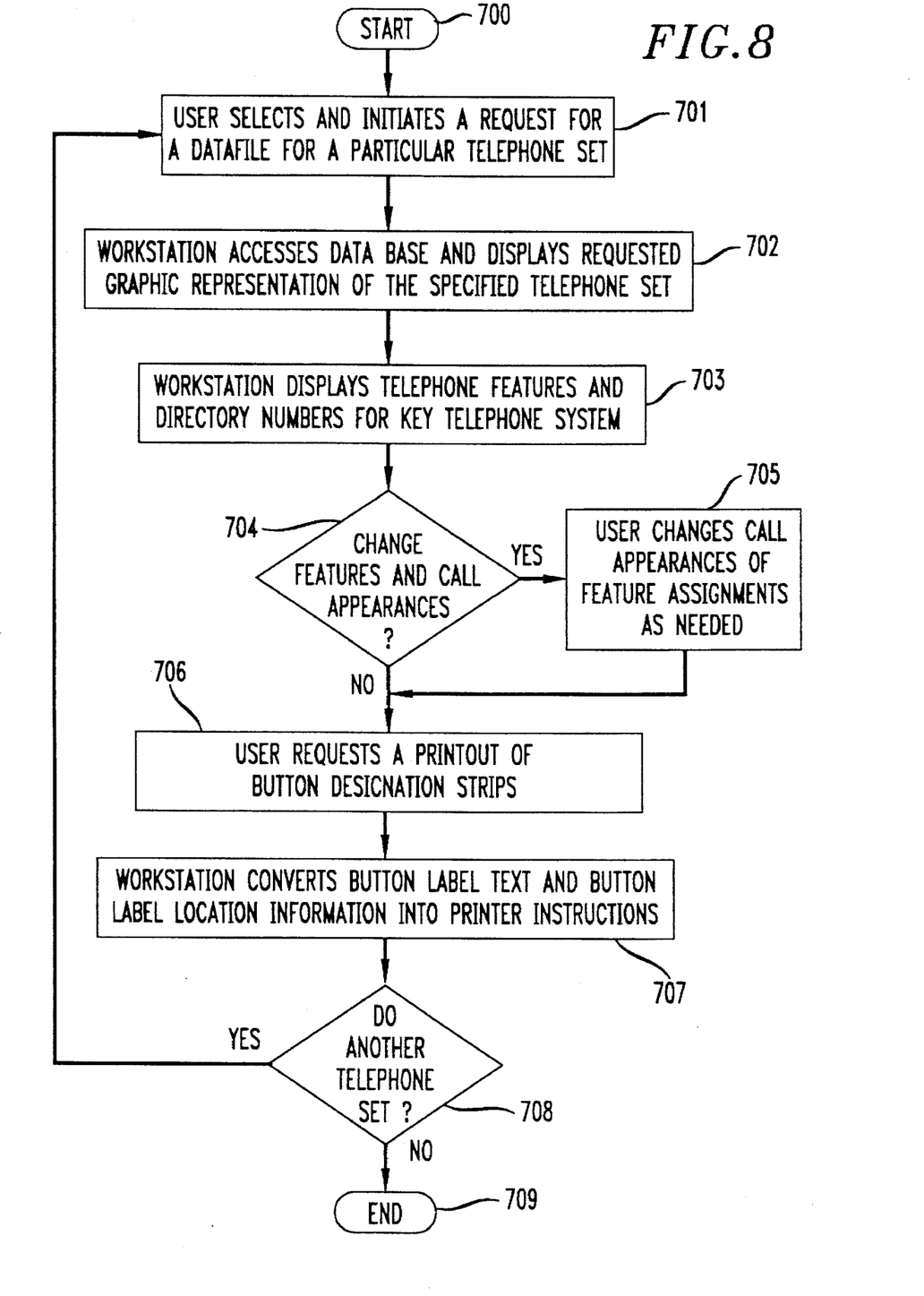
Figure 9:
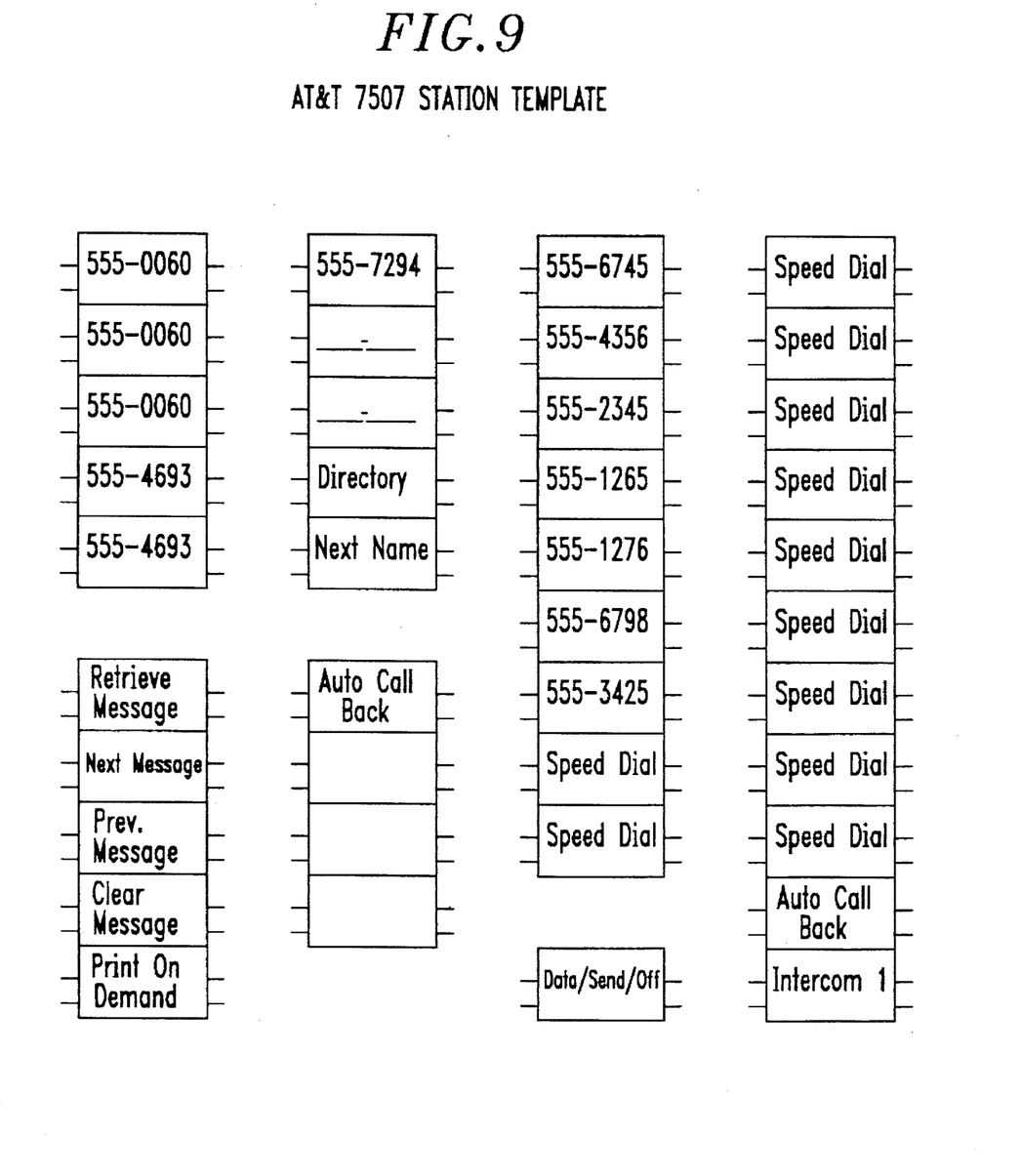
FIG. 9 is an illustrative example of designation strips printed in accord with the principles of the invention.

The various steps implementing the overall process are illustrated in FIG. 8. Specifically, the user (customer) starts the process (block 701) by entering via keyboard 63 a request to display a network management controller 210 data file relating to the services and features associated with a specified station set, e.g. station set 600-2. Workstation 60, responsive thereto and in accord with the teaching of the aforementioned Cocklin patent, sends a message requesting a copy of the data file to controller 210. Upon receipt of the file via path 162, controller 61 displays (block 702) the file illustrating the station set specified in the entered request. In doing so, workstation 60 (block 703) displays the various telephone features and telephone numbers associated with the specified station set. At that point, the user may decide (block 704) to change particular ones of the features and call appearances. If that decision is affirmative, then the user (block 705) may do so in accord with the aforementioned Cocklin et al patent and then, in accord with an aspect of the invention, enter a request (block 706) to a print out a "hard copy" version of the associated button designation strips. Workstation 60, responsive to that request, effectively overlays the text file defining the function designations of the various buttons associated with the specified station set and identified by respective identifiers set on the template file defining the layout of the designation strips for that type of station set and forwards the result to printer 300 (FIG. 1) for printing on the appropriate die-cut paper stock. That is, the process prints the function designation established for the button associated with the logical identifier having a value of one within the specified template label that is also associated with that logical identifier, and so on. FIG. 9 illustrates an example of the printed result. The process (block 708) then presents the user with the option of specifying another station set or exiting from the process (block 709).

The foregoing is merely illustrative of the principles of the invention. Those skilled in the art will be able to devise numerous arrangements, which, although not explicitly shown or described herein, nevertheless embody those principles that are within the spirit and scope of the invention. For example, although the foregoing discussion was directed to station set 600-2, it is apparent that the claimed invention is not limited to that station set but is applicable to virtually any type of station set, e.g., station set 600-3.

I claim:

1. A method of printing button designation strips for a telephone station set comprising the steps of storing in memory customer-defined telephone button and line features that are associated with respective buttons of a predetermined telephone station set, in which said association is based on assigning logical identifiers to respective ones of said buttons, creating a template file defining a layout of labels matching a predefined layout of labels on a sheet of paper stock labels, in which the number of template labels match the number of buttons on said predetermined telephone station set and correspond with respective ones of said logical identifiers, and combining said stored customer-defined telephone button and line features with said template file and outputting the result to a printer such that text and/or telephone line numbers representing features associated with respective ones of said logical identifiers are printed at paper stock label locations defined by the template file.

2. The method of claim 1 wherein said step of creating includes the step of interacting with a workstation having a display for graphically displaying a template of said predefined layout of labels, in which said layout is similar to the layout of labels on said sheet of paper stock labels.

3. The method of claim 2 further comprising the step of storing said displayed template in a database in the form of data defining said layout.

4. A method of interacting with a telecommunications system comprising the steps of storing in memory data records characterizing graphical representations of respective ones of telephone station sets, each of said graphical representations identifying functional designations associated with telephone buttons of respective ones of said telephone station sets, storing in a workstation having a display a template associating the functional designations of at least one of said station sets with respective designation strips formed by a die-cut procedure in paper stock, and responsive to a request entered by a user, printing said functional designations onto respective ones of said designation strips as identified by said template.

5. The method of claim 4 wherein said method further comprises the steps of associating said buttons with respective numerical identifiers, and creating said template by graphically defining on said display a layout of said designations strips corresponding with respective ones of said numerical identifiers and said designation trips.

6. The method of claim 4 further comprising the steps of interacting with a manager controller via said workstation to implement changes to said telephone station sets served by said telecommunications system, displaying a graphical representation of said at least one of said telephone station sets, and enabling said user to selectively enter telephone line features and directory numbers onto said graphical representation and instruct said manager controller to cause said telecommunications system to assign the user selected telephone lines, features and directory numbers to said at least one of said telephone station sets.

* * * * *